United States Patent
Sarkis et al.

(10) Patent No.: US 10,999,849 B2
(45) Date of Patent: May 4, 2021

(54) SUPPORT FOR SINGLE-CODE USER EQUIPMENT

(71) Applicant: QUALCOMM Incorporated, San Diego, CA (US)

(72) Inventors: Gabi Sarkis, San Diego, CA (US); Joseph Binamira Soriaga, San Diego, CA (US); Jing Jiang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 16/442,020

(22) Filed: Jun. 14, 2019

(65) Prior Publication Data

US 2020/0396738 A1    Dec. 17, 2020

(51) Int. Cl.
*H04W 72/04*    (2009.01)
*H04W 76/11*    (2018.01)
(Continued)

(52) U.S. Cl.
CPC ....... *H04W 72/0466* (2013.01); *H04L 1/0003* (2013.01); *H04L 1/0061* (2013.01);
(Continued)

(58) Field of Classification Search
None
See application file for complete search history.

(56) References Cited

U.S. PATENT DOCUMENTS

| 2012/0157090 A1* | 6/2012 | Kim | H04W 24/08 |
| | | | 455/424 |
| 2014/0064350 A1* | 3/2014 | Krauss | H04L 25/03254 |
| | | | 375/232 |
| 2018/0241499 A1* | 8/2018 | Einhaus | H04L 5/0094 |

FOREIGN PATENT DOCUMENTS

| WO | WO-2017015528 A1 | 1/2017 | |
| WO | WO-2019050323 A1 * | 3/2019 | ............. H04L 5/001 |

OTHER PUBLICATIONS

Ericsson: "On Channel Coding of PBCH", 3GPP Draft, 3GPP TSG RAN WG1 AH_NR Meeting, R1-1700116 on Channel Coding of PBCH, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan. 20, 2017, Jan. 10, 2017 (Jan. 10, 2017), XP051202624, 4 Pages, Retrieved from the Internet: URL: http://www.3gpp.org/ftp/tsg_ran/WG1_RL1/TSGR1_AH/NR_AH_1701/Docs/, [retrieved on Jan. 10, 2017], * section 2 *.

(Continued)

*Primary Examiner* — Ayanah S George
(74) *Attorney, Agent, or Firm* — QUALCOMM Incorporated

(57) ABSTRACT

Methods, systems, and devices for wireless communication are described. A wireless device may determine that a serving base station supports multi-code and single-code transmissions, receiving a scheduling message having a cyclic redundancy check scrambled with a radio network temporary identifier (RNTI), determine resources for communicating with the serving base station based on the scheduling message, and communicate on the resources using coding associated with the single-code transmissions. A base station may identify at least one user equipment that supports single-code transmissions, transmit a scheduling message having a cyclic redundancy check (CRC)

(Continued)

scrambled with a radio network temporary identifier (RNTI), wherein the scheduling message schedules the at least one user equipment for communication on resources using coding associated with the single-code transmissions and communicate with the at least one user equipment on the resources using the coding.

40 Claims, 8 Drawing Sheets

(51) Int. Cl.
    *H04L 1/00*     (2006.01)
    *H04W 68/00*     (2009.01)
    *H04W 74/08*     (2009.01)

(52) U.S. Cl.
    CPC ..... *H04W 68/005* (2013.01); *H04W 74/0833* (2013.01); *H04W 76/11* (2018.02)

(56) References Cited

OTHER PUBLICATIONS

International Search Report and Written Opinion—PCT/US2020/034084—ISAEPO—dated Aug. 24, 2020.
Qualcomm Incorporated: "LDPC for EMBB and URLLC", 3GPP Draft, 3GPP TSG-RAN WG1 #86bis, R1-1610136_LDPC_for_EMBB_URLLC, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051150159, 3 Pages, Retrieved from the Internet: URL: http://www.3gpp.org/ftp/Meetings_3GPP_SYNC/RAN1/Docs/, [retrieved on Oct. 9, 2016], * Introduction *.

* cited by examiner

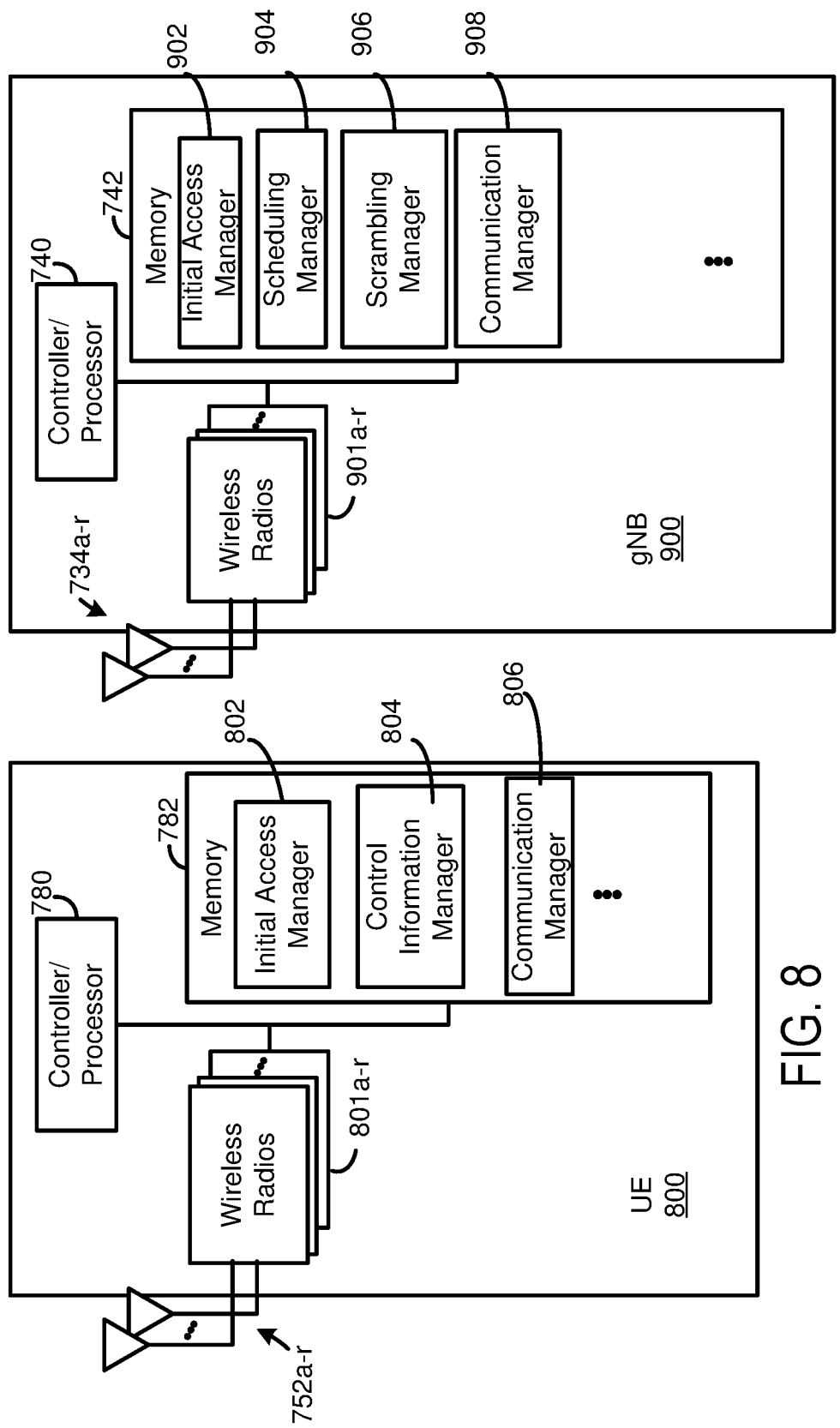

SUPPORT FOR SINGLE-CODE USER EQUIPMENT

BACKGROUND

The following relates to wireless communication and support for single-code user equipment.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support scheduling of single-code user equipment (UE). A method of wireless communication is described. The method may include determining that a serving base station supports multi-code and single-code transmissions, receiving a scheduling message having a cyclic redundancy check scrambled with a radio network temporary identifier (RNTI), determining resources for communicating with the serving base station based on the scheduling message, and communicating on the resources using coding associated with the single-code transmissions.

An apparatus for wireless communication is described. The apparatus may include a processor, a memory in electronic communication with the processor, and instructions stored in the memory. The instructions may be executable by the processor to cause the apparatus to determine that a serving base station supports multi-code and single-code transmissions, receive a scheduling message having a cyclic redundancy check scrambled with a radio network temporary identifier (RNTI), determine resources for communicating with the serving base station based on the scheduling message, and communicate on the resources using coding associated with the single-code transmissions.

A non-transitory computer readable medium storing code for wireless communication is described. The code may include instructions executable by a processor to determine that a serving base station supports multi-code and single-code transmissions, receive a scheduling message having a cyclic redundancy check scrambled with a radio network temporary identifier (RNTI), determine resources for communicating with the serving base station based on the scheduling message, and communicate on the resources using coding associated with the single-code transmissions.

Another apparatus for wireless communication is described. The apparatus may include means for determining that a serving base station supports multi-code and single-code transmissions, means for receiving a scheduling message having a cyclic redundancy check scrambled with a radio network temporary identifier (RNTI), means for determining resources for communicating with the serving base station based on the scheduling message, and means for communicating on the resources using coding associated with the single-code transmissions.

In some examples of the method, apparatuses, or non-transitory computer-readable medium described herein, the determining that the serving base station supports single-code transmissions includes receiving an indication comprising a MAC reserved bit or a physical layer reserved bit. In some examples, the RNTI is a system information RNTI (SI-RNTI) associated with single-code transmission scheduling, and wherein the communicating includes receiving a system information block (SIB) having coding associated with single-code transmissions. In some examples, the RNTI is a system information RNTI (SI-RNTI) associated with multi-code transmission scheduling. In some examples, the determining resources comprises identifying resources, located at an offset from resources scheduled by the scheduling message, for receiving a system information block (SIB) having coding associated with single-code transmissions. In some examples, the communicating includes receiving a system information block (SIB) on a Physical Downlink Control Channel (PDCCH). In some examples, the RNTI is a paging RNTI (P-RNTI) associated with single-code transmission scheduling, and wherein the communicating includes receiving a paging message having coding associated with single-code transmissions.

In some examples, the RNTI is a paging RNTI (P-RNTI) associated with multi-code transmission scheduling. In some examples, the determining resources comprises identifying resources, located at an offset from resources scheduled by the scheduling message, for receiving a paging message having coding associated with single-code transmissions. In some examples, the determining resources comprises identifying resources, based additionally on bits in a master information block (MIB) or a system information block (SIB), for receiving a paging message having coding associated with single-code transmissions. In some examples, the scheduling message includes a field indicating an upcoming paging message having coding associated with single-code transmissions. In some examples, the field further indicates whether a short message is present in the scheduling message. In some examples, a bit in a master information block (MIB) indicates whether a short message is present in the scheduling message. In some examples, the RNTI is a cell RNTI (C-RNTI), configured scheduling RNTI (CS-RNTI), or a modulation and coding scheme RNTI (MCS-RNTI) associated with single-code transmission scheduling, and wherein the communicating includes unicast single-code transmissions on a downlink or uplink shared channel.

Some examples of the method, apparatuses, or non-transitory computer-readable medium described herein may further include processes, features, means, or instructions for sending a random access message on random access channel (RACH) resources associated with single-code transmissions. Some examples of the method, apparatuses, or non-transitory computer-readable medium described herein may further include processes, features, means, or instructions for sending a random access message using a preamble associated with single-code transmissions. Some examples of the method, apparatuses, or non-transitory computer-readable medium described herein may further include processes, features, means, or instructions for including an indication of single-code transmission support in a random access message, encoding a data portion of the random access message using a particular coding associated with single-code transmissions, and transmitting the random access message. Some examples of the method, apparatuses, or non-transitory computer-readable medium described herein may further include processes, features, means, or instructions for determining an initial bandwidth part parameter based at least on an indication in a master information block (MIB).

A method of wireless communication is described. The method may include identifying at least one user equipment that supports single-code transmissions, transmitting a scheduling message having a cyclic redundancy check (CRC) scrambled with a radio network temporary identifier (RNTI), wherein the scheduling message schedules the at least one user equipment for communication on resources using coding associated with the single-code transmissions, and communicating with the at least one user equipment on the resources using the coding.

An apparatus for wireless communication is described. The apparatus may include a processor, a memory in electronic communication with the processor, and instructions stored in the memory. The instructions may be executable by the processor to cause the apparatus to identify at least one user equipment that supports single-code transmissions, transmit a scheduling message having a cyclic redundancy check (CRC) scrambled with a radio network temporary identifier (RNTI), wherein the scheduling message schedules the at least one user equipment for communication on resources using coding associated with the single-code transmissions, and communicate with the at least one user equipment on the resources using the coding.

A non-transitory computer readable medium storing code for wireless communication is described. The code may include instructions executable by a processor to identify at least one user equipment that supports single-code transmissions, transmit a scheduling message having a cyclic redundancy check (CRC) scrambled with a radio network temporary identifier (RNTI), wherein the scheduling message schedules the at least one user equipment for communication on resources using coding associated with the single-code transmissions, and communicate with the at least one user equipment on the resources using the coding.

Another apparatus for wireless communication is described. The apparatus may include means for identifying at least one user equipment that supports single-code transmissions, means for transmitting a scheduling message having a cyclic redundancy check (CRC) scrambled with a radio network temporary identifier (RNTI), wherein the scheduling message schedules the at least one user equipment for communication on resources using coding associated with the single-code transmissions, and means for communicating with the at least one user equipment on the resources using the coding.

In some examples of the method, apparatuses, or non-transitory computer-readable medium described herein, the RNTI is associated with single-code transmission scheduling. Some examples of the method, apparatuses, or non-transitory computer-readable medium described herein may further include processes, features, means, or instructions for transmitting a second scheduling message having a CRC scrambled with a RNTI associated with multi-code transmission scheduling, wherein the second scheduling message schedules at least a second user equipment for communication on resources using coding associated with the multi-code transmission scheduling. In some examples, the RNTI is associated with multi-code transmission scheduling. In some examples, the communicating with the at least one user equipment on the resources is based at least in part on the scheduling message and an offset from resources scheduled by the scheduling message according to multi-code transmission scheduling.

Some examples of the method, apparatuses, or non-transitory computer-readable medium described herein may further include processes, features, means, or instructions for including an offset in a master information block (MIB), using a reserved bit in the MIB, that provides information for determining the resources, and transmitting the MIB. Some examples of the method, apparatuses, or non-transitory computer-readable medium described herein may further include processes, features, means, or instructions for including an offset in a system information block (SIB) that provides information for determining the resources, and transmitting the SIB. In some examples, identifying the at least one user equipment comprises receiving a random access message on random access channel (RACH) resources associated with single-code transmissions, receiving a preamble associated with single-code transmissions in the random access message, or receiving an indication in the random access message.

BRIEF DESCRIPTION OF THE DRAWINGS

FIG. 8 is a block diagram illustrating a UE configured according to some embodiments of the present disclosure.

FIG. 9 is a block diagram illustrating a base station configured according to some embodiments of the present disclosure.

DETAILED DESCRIPTION

Figure 1:
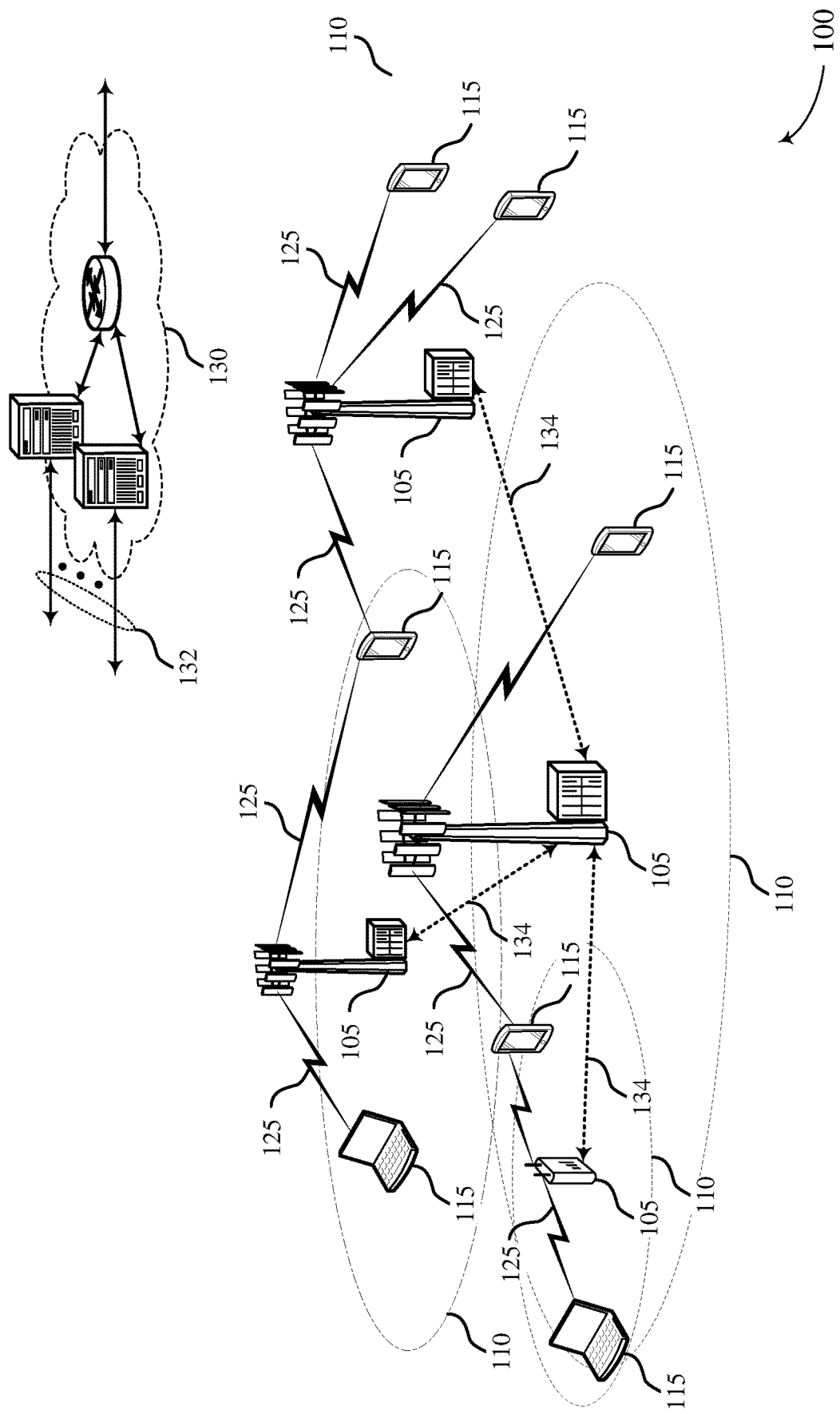
FIG. 1 illustrates an example of a system for wireless communication that supports single-code transmissions in accordance with aspects of the present disclosure.

In various deployments of 5G New Radio (NR), low density parity check (LDPC) codes are used to encode data transmissions, such as for unicast Physical Downlink Shared Channel (PDSCH) and Physical Uplink Shared Channel (PUSCH) transmissions, as well as system information block (SIB), random access (RA), and paging messages. In NR deployments, polar codes are used to encode control messages, including Physical Broadcast Channel (PBCH) messages. Accordingly, a UE may generally use at least two different coding schemes for communication on an NR network—polar coding for transmission of control information and LDPC coding for unicast data and other types of transmissions. In some situations, however, particular classes of UEs may be configured for utilizing a single class of codes for communications rather than the use of two or more types of coding, as is generally used in NR. Such classes of UEs may include, for example, NR massive Machine Type Communication (mMTC) or NR Narrowband Internet of Things (NB-IOT) UEs. mMTC and NB-IOT UEs may include UEs that operate with little or no human intervention, and may be characterized by low power, automated or repetitive communications, or low-cost design. As such, these UEs may have simplified design with encoders and decoders for a single or fewer types of codes.

As disclosed in further detail herein, a wireless communication system may provide for signaling, resource scheduling, and communication for UEs that support a single, or limited, coding scheme (i.e., "single-code" UEs). In various aspects of the disclosure, wireless communications may provide for communications using a single coding scheme for UEs that support a single class of codes. As will be described in more detail below, a UE that supports single-code transmissions monitors for a scheduling message having a cyclic redundancy check (CRC) scrambled with a particular type of radio network temporary identifier (RNTI), which may be used for scheduling single-code UEs. A single-code UE that receives scheduling based on such a RNTI may then communicate on particular resources using single-code transmissions. In some aspects, a single-code UE may be scheduled using a scheduling message with traditional RNTI, with the UE determining resources for single-code transmissions based on an offset or other indicator. Although the term "single-code" UE is used in the present disclosure, UEs that predominantly use one type of coding for communications, but that also support other types of coding (e.g., repetition, simplex, etc.) for small uplink control transmissions, may also be referred to as "single-code" UEs.

Aspects of the disclosure are initially described in the context of a wireless communications system. Aspects of the disclosure are further illustrated by and described with reference to apparatus diagrams, system diagrams, and flowcharts that relate to support for single-code communications. The detailed description set forth below, in connection with the appended drawings and appendix, is intended as a description of various configurations and is not intended to limit the scope of the disclosure. Rather, the detailed description includes specific details for the purpose of providing a thorough understanding of the present disclosure. It will be apparent to those skilled in the art that these specific details are not required in every case and that, in some instances, well-known structures and components are shown in block diagram form for clarity of presentation.

This disclosure relates generally to support for single-code communications. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5G NR networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth, for example. For other various indoor wideband implementations, using a TDD over the unlicensed portion of the 5 GHz band, the subcarrier spacing may occur with 60 kHz over a 160 MHz bandwidth, for example. Finally, for various deployments transmitting with mmWave components at a TDD of 28 GHz, subcarrier spacing may occur with 120 kHz over a 500 MHz bandwidth, for example. Other deployments of different subcarrier spacing over different bandwidths are also within the scope of the present disclosure.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates an example of a wireless communications system 100 that supports single-code transmissions in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. Each access network entity may communicate with UEs 115 through a number of other access network transmission entities, which may be referred to as a radio head, a smart radio head, a remote radio head, or a transmission/reception point (TRP). The functions performed by base stations 105 may be carried out via these network entities (e.g., TRPs). Accordingly, as described herein, the terms TRP, eNB, gNB, and base station may be used interchangeably unless otherwise noted.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. In some implementations, such as in factory automation settings and as used in certain examples herein, a UE 115 may also refer to a sensor/actuator (S/A) unit 115 that communicates with a programmable logic controller (PLC) that acts as a TRP 105 or base station 105.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention or with minimal human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, MTC or IoT devices may be designed for low cost operation and, accordingly, may include fewer types of encoders and decoders for wireless communications. The reduced complexity may result in communication using single-code transmissions, as opposed to at least two types of coding in NR networks (e.g., polar codes for control and LDPC codes for data and other messages). As described in further detail herein, various methods and apparatuses are described for indicating and scheduling single-code transmissions.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). In some examples, base stations 105 or TRPs 105 may communicate with each other through backhaul links 134 to coordinate transmission and reception of signals with UEs 115. For example, a first base station 105 may determine from CSI reports that transmissions from a neighboring base station 105 are negatively interfering with communications between the first base station 105 and the UE 115. Accordingly, the first base station 105 may inform the neighboring base station 105 via backhaul links 134 of the interference or request that the neighboring base station 105 mute transmissions on certain resources or transmit on different resources.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds ($Tf=307200*Ts$). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In 5G NR deployments, a radio frame may have a duration of 10 ms, and one slot may comprise 14 OFDM symbols, but the number of slots in a 5G NR radio frame may vary due to flexible numerology resulting in a flexible time-slot structure. In particular, the numerology for 5G NR may include sub-carrier spacings of 15 kHz, 30 kHz, 60 kHz, or 120 kHz, depending on the system configuration and bandwidth. For example, with increased sub-carrier spacing, the symbol duration decreases while the radio frame duration would remain the same. Accordingly, if the sub-carrier spacing is increased from 15 kHz to 30 kHz, the duration of each slot is halved, resulting in 20 slots within the 10 ms radio frame.

In some wireless communications systems, a slot may further be divided into multiple mini-slots containing one or more symbols and, in some instances, a symbol of a mini-slot or a mini-slot may be the smallest unit of scheduling. In some deployments, such as in 5G NR, each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one sub-carrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain, or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz for LTE). In 5G NR, the carrier bandwidth may range from 5 MHz up to 100 MHz for sub-6 GHz frequency spectrum, and from 50 MHz up to 400 MHz for mmW frequency spectrum (above 24 GHz frequency spectrum). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As depicted in FIG. 1, a UE 115 may communicate over wireless communication links 125 with a particular serving base station 105. In some instances, the UE 115 may communicate using one type of coding over communication links 125 instead of two or more types of coding, such as polar codes for control information and LDPC for data and other transmissions, as commonly used in some networks, such as NR networks. In particular, the UE 115 may determine whether a base station 105 supports communications using a single coding type rather than or in addition to communications using multiple coding types. If the base station 105 supports single-code communications, the base station 105 may transmit scheduling messages on the downlink over communication links 125, where the scheduling messages include a cyclic redundancy check (CRC) scrambled with a radio network temporary identifier (RNTI). The particular RNTI used may be associated with single-code communications to indicate to the UE 115 that the resources being scheduled are for single-code communications. In some instances, the RNTI used may not be associated with single-code communications, but the UE 115 may determine the resources allocated for single-code communications based on an offset from the resources scheduled by the scheduling message. The UE 115 may then transmit or receive transmissions coded using the one type of coding supported by the UE 115 over communication links 125. Other procedures and details for supporting communication by single-code UEs 115 are described herein.

Figure 2:
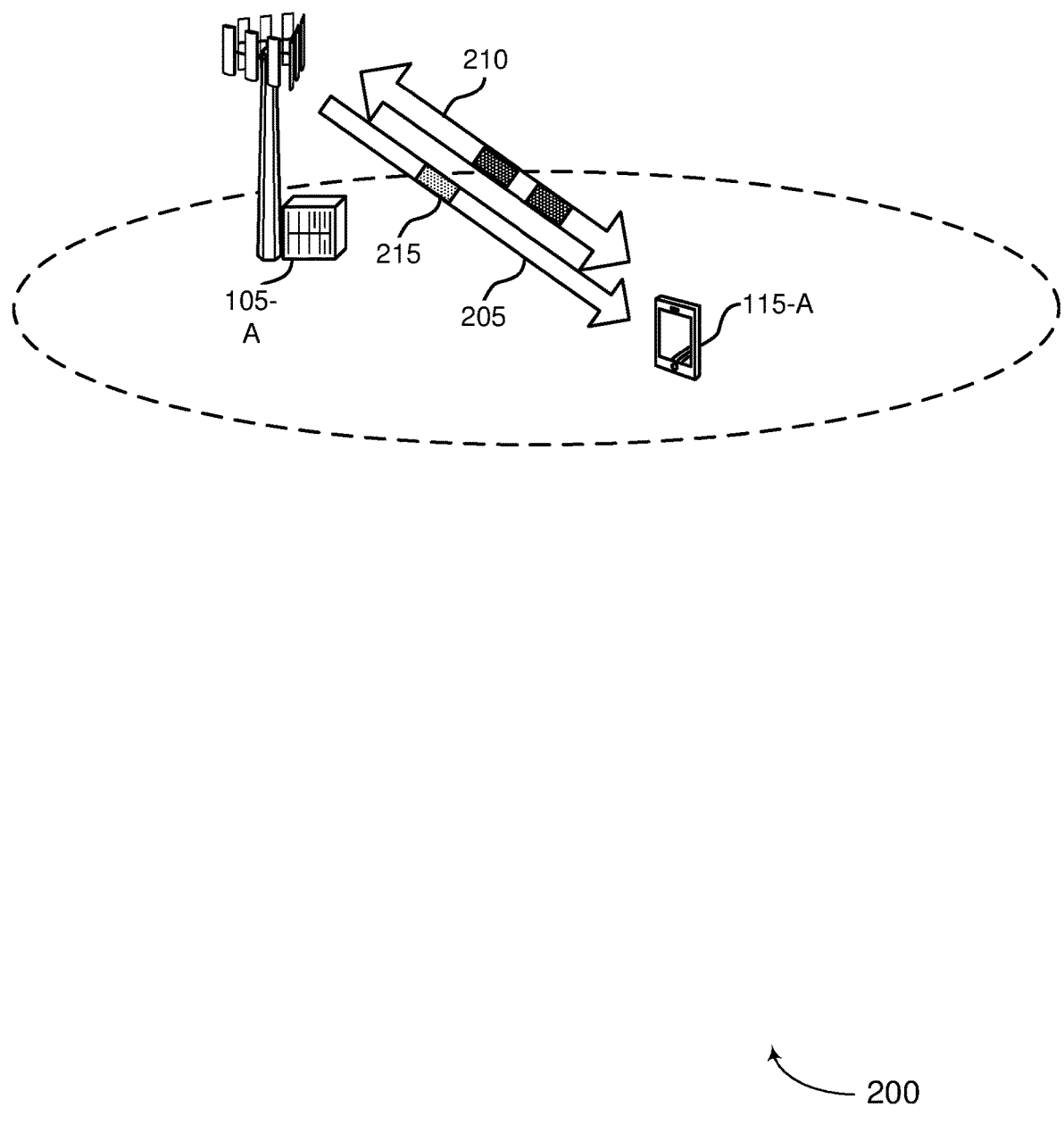
FIG. 2 illustrates an example of a system for wireless communication that supports single-code transmissions in accordance with aspects of the present disclosure.

FIG. 2 illustrates an example of a wireless communication system 200 that supports single-code transmissions for a UE in accordance with various aspects of the present disclosure. In some examples, wireless communication system 200 may implement aspects of wireless communication system 100. For example, wireless communication system 200 includes UE 115-a and base station 105-a, which may be examples of the corresponding devices described with reference to FIG. 1. Wireless communication system 200 may support scheduling of resources for UEs 115-a that support a single coding scheme for communications.

UE 115-a may be synchronized with and camped on base station 105-a. In an example, UE 115-a may support a single-coding scheme as opposed to multi-coding schemes, such as a coding scheme that uses polar coding for control messages and LDPC coding for data and additional messages, as used in NR systems. The base station 105-a may, in some instances, support communications using a single-coding scheme with UE 115-a in addition to or instead of communications using multi-coding schemes. For example, the base station 105-a may indicate to the UE 115-a, using a MAC reserved bit or one or more physical layer bits, such as a bit indicator in a MIB, that it supports single-code transmissions. In some instances, the bits used to indicate support for single-code transmissions may include a MAC reserved bit that is used to signal whether a Broadcast Channel (BCH) contains a format of a Master Information Block (MIB) that is used in a current wireless communications specification, such as NR, or a different format of the MIB. In the present example, the MAC reserved bit may indicate that an alternative format of the MIB associated with a single-code network will be used in an upcoming communication. In some instances, the base station 105-a may use physical (PHY) layer bits, such as three PHY bits in MIB for a sub-6 GHz frequency range or one PHY bit in MIB for mmW frequency ranges, to indicate support for communications with single-code UEs. The PHY bit(s) may comprise a bit(s) that is normally reserved during normal operation but that may be used for the purpose of indicating single-coding scheme support as described in the present disclosure. Still further, instead of receiving an explicit indication from the network regarding whether the base station 105-a supports single-code UEs, the UE 115-a may attempt to decode all System Information Block (SIB) transmissions using different codes until a particular type of coding succeeds.

After the UE 115-*a* determines that the base station 105-*a* supports communications with single-code UEs, the UE 115-*a* and base station 105-*a* may perform appropriate operations for scheduling and communicating using single code transmissions. For example, the base station 105-*a* may then send a transmission 205 that includes a scheduling message 215, having a cyclic redundancy check (CRC) scrambled with a radio network temporary identifier (RNTI) to the UE 115-*a*. Typically, the RNTI may be associated with scheduling for all transmissions, including multi-code transmissions. In some instances, however, the base station 105-*a* may transmit scheduling messages for both multi-code UEs and single-code UEs. In order for the different types of UEs to determine which scheduling messages 215 are directed to, and by extension which resources are allocated to, multi-code UEs as opposed to single-code UEs, the base station 105-*a* may use a separate RNTI associated with communications with single-code UEs for scrambling with CRC in a scheduling message 215. Accordingly, after determining that the base station 105-*a* supports communications with single-code UEs, the UE 115-*a* may monitor for the RNTI associated with single-code communications instead of a traditional RNTI associated with multi-code transmissions, when receiving the scheduling message 215. The UE 115-*a* may then determine the resources allocated to the UE 115-*a* from the scheduling message 215 and communicate 210 on the resources using a single-coding scheme.

The base station 105-*a* may schedule the UE 115-*a* for various types of communications using a single-coding scheme in accordance with the present disclosure. For example, the base station 105-*a* may schedule transmission of SIB messages, paging messages, unicast shared channel transmissions, random access messages, initial bandwidth part signaling, and the like, in accordance with scheduling procedures as described herein.

Figure 3:
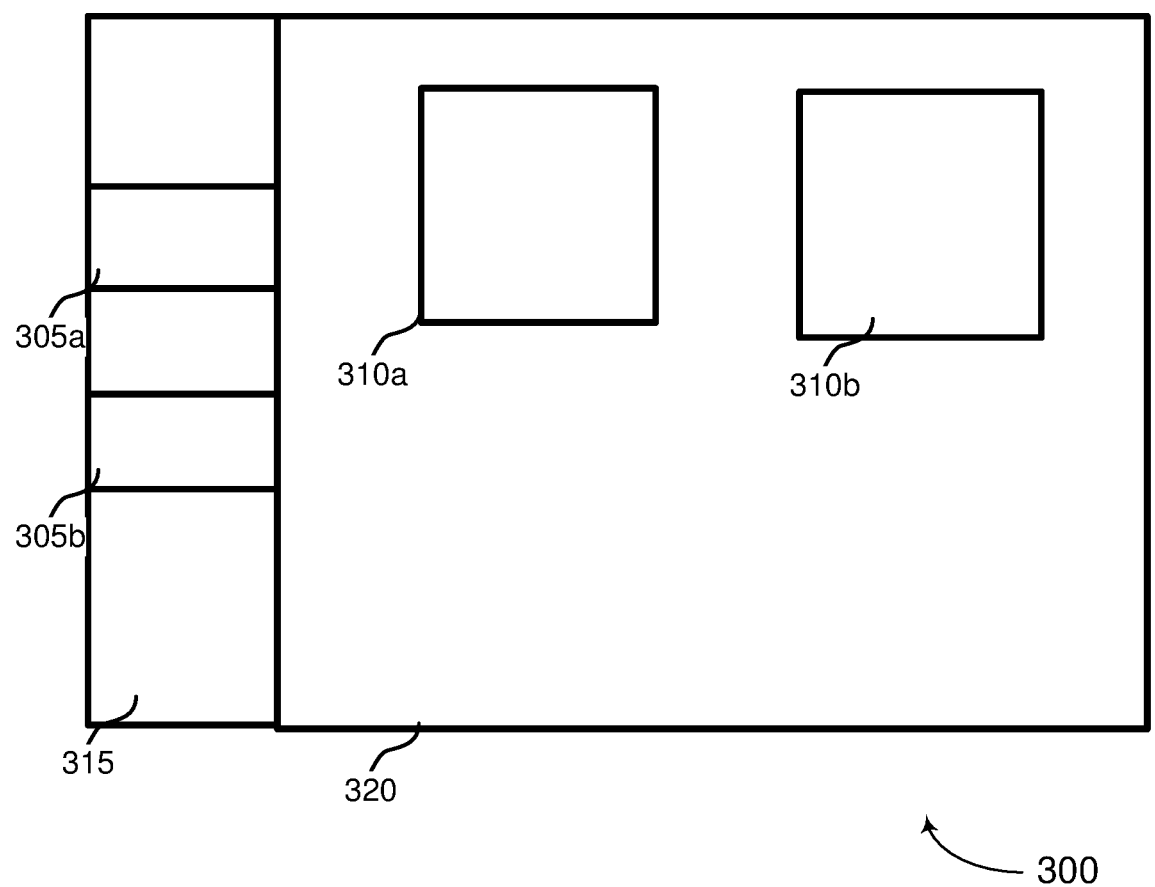
FIG. 3 illustrates an example resource allocation for single-code user equipment in accordance with various aspects of the present disclosure.

FIG. 3 illustrates example resource allocations 300 that depict how single-coding scheme or multi-coding scheme transmissions may be scheduled. As depicted in the illustrated figure, a base station 105-*a* may transmit, and a UE 115-*a* may receive, a grant or scheduling message 305 (e.g., scheduling message 305*a* or 305*b*) that grants resources for an upcoming transmission 310 (e.g., transmission 310*a* or 310*b*). In some instances, the base station 105-*a* may transmit the scheduling message 305 in a physical downlink control channel (PDCCH), where the scheduling message 305 schedules resources for an upcoming transmission 310 in a shared channel 320, such as a physical uplink shared channel (PUSCH) or physical downlink shared channel (PDSCH). The transmission 310 in the shared channel 320 may comprise SIB messages, paging messages, unicast shared channel transmissions, random access messages, initial bandwidth part signaling, etc.

In NR systems, the base station 105-*a* may transmit SIB messages on the PDSCH 320. In some instances, the base station 105-*a* may schedule, using a grant message in a control channel 315, resources for transmitting the SIB messages, where the grant message includes a CRC scrambled using system information RNTI (SI-RNTI). While the grant message scrambled with the SI-RNTI may be used for scheduling UEs that communicate using multi-coding schemes, in some instances, the base station 105-*a* may additionally transmit a separate grant message that includes a CRC scrambled using a separate SI-RNTI that is uniquely associated with single-coding scheme transmissions. For example, as illustrated in FIG. 3, the base station 105-*a* may transmit a first scheduling message 305*a* with a CRC scrambled with a traditional SI-RNTI for scheduling multi-coding scheme transmissions 310*a*. The base station 105-*a* may also optionally transmit a second scheduling message 305*b* with a CRC scrambled with a SI-RNTI associated with single-coding scheme transmissions to schedule an upcoming transmission 310*b*. Accordingly, a single-code UE 115-*a* may be able to determine specific resources in PDSCH for receiving a SIB message 310*b* in accordance with the single coding scheme based on the grant message 305*b* having the CRC scrambled with the SI-RNTI associated with the single coding scheme. Similarly, a multi-code UE 115-*a* may determine resources in PDSCH for receiving SIB messages 310*a* in accordance with a multiple coding scheme based on the grant message 305*a* with CRC scrambled with a multi-coding scheme SI-RNTI.

In some instances, instead of transmitting separate grant messages with CRC scrambled with different SI-RNTI based on whether the grant message schedules a multi-code UE 115-*a* or a single-code UE 115-*a*, the base station 105-*a* may transmit a single grant message (e.g., grant message 305*a*) with CRC scrambled with one type of SI-RNTI. The single grant message 305*a* may schedule resources for multi-coding scheme transmissions, such as a SIB 310*a*, but a single-code UE 115-*a* may determine its single-code scheme specific resource allocation 310*b* based on an offset from the scheduled resources or on other indicators. That is, multi-code UEs may determine scheduled resources for receiving a SIB 310*a* directed at multi-code UEs based solely on the grant message 305*a*, while single-code UEs may determine scheduled resources for a SIB 310*b* directed at single-code UEs based on the grant message 305*a* as well as additional information, such as an offset. In certain instances, the offset may comprise a static offset that is known to both the base station 105-*a* and UE 115-*a*, such as a predefined offset specified in a standard. In other instances, the base station 105-*a* may communicate the offset in the PDCCH transmission that includes the grant message 305*a*. Accordingly, the UE 115-*a* may determine the location of resources used for single coding scheme transmissions based on the offset and the grant message 305*a*. In other instances, the base station 105-*a* may transmit the grant message 305*a* to schedule resources for multi-coding scheme transmissions 310*a* and then use the remaining reserved bits in a MIB to indicate the location of the resources allocated for single-code transmissions 310*b*.

Multi-code UEs may, in some instances receive and decode multiple SIB messages (e.g., SIB1, SIB2, etc.) for obtaining system information. In some instances, a single-code UE may only decode a first SIB (SIB1) that contains remaining minimum system information (RMSI). For example, apart from the RMSI contained in SIB1, low complexity or low power devices operating as single-code UEs may not need additional system information found in other SIB messages. Further, in certain instances, instead of transmitting SIB1 for single-code UEs using PDSCH, the base station 105-*a* may transmit SIB1 for single-code UEs using a new downlink control information (DCI) format in PDCCH. Accordingly, single-code UEs may determine that system information contained in SIB1 is directed for single-code UEs based on receiving SIB1 in PDCCH instead of PDSCH.

The example illustration in FIG. 3 may also depict scheduling for other types of transmissions for single-code UEs. For example, the base station 105-*a* may schedule, using a grant message in a control channel 315, resources for transmitting a paging communication 310 (e.g., 310*a* or 310*b*) on PDSCH or in DCI in some instances. The grant message 305 may include a CRC scrambled with a paging RNTI (P-RNTI). While the grant message scrambled with the P-RNTI may be used for scheduling UEs that communicate using multiple coding schemes, in some instances, the base station 105-*a* may additionally transmit a separate grant message that includes a CRC scrambled using a separate P-RNTI that is uniquely associated with single coding scheme transmissions. For example, as illustrated in FIG. 3, the base station 105-*a* may transmit a first scheduling message 305*a* with a CRC scrambled with a traditional P-RNTI for scheduling multi-coding scheme transmissions 310*a*. The base station 105-*a* may also optionally transmit a second scheduling message 305*b* with a CRC scrambled with a P-RNTI associated with single-coding scheme transmissions to schedule an upcoming transmission 310*b*. Accordingly, a single-code UE 115-*a* may be able to determine specific resources in PDSCH for receiving a paging message 310*b* in accordance with the single coding scheme based on the grant message 305*b* having the CRC scrambled with the P-RNTI associated with the single coding scheme. Similarly, a multi-code UE 115-*a* may determine resources in PDSCH for receiving paging messages 310*a* in accordance with a multiple coding scheme based on the grant message 305*a* with CRC scrambled with a multi-coding scheme P-RNTI.

Similar to scheduling of SIB transmissions, in some instances, instead of transmitting separate grant messages with CRC scrambled with different P-RNTI based on whether the grant message schedules a multi-code UE 115-*a* or a single-code UE 115-*a*, the base station 105-*a* may transmit a single grant message (e.g., grant message 305*a*) with CRC scrambled with one type of P-RNTI. The single grant message 305*a* may schedule resources for multi-coding scheme transmissions, such as a paging message 310*a*, but a single-code UE 115-*a* may determine its single-code scheme specific resource allocation 310*b* based on an offset from the scheduled resources or on other indicators. That is, multi-code UEs may determine scheduled resources for receiving a paging message 310*a* directed at multi-code UEs based solely on the grant message 305*a*, while single-code UEs may determine scheduled resources for a paging message 310*b* directed at single-code UEs based on the grant message 305*a* as well as additional information, such as an offset.

The UE 115-*a* may determine the offset for single-code transmission resources based on various factors. For example, in certain instances, the offset may comprise a static offset that is known to both the base station 105-*a* and UE 115-*a*, such as a predefined offset specified in a standard. In other instances, the base station 105-*a* may communicate the offset in the PDCCH transmission that includes the grant message 305*a* or in system information messages, such as a SIB. Accordingly, the UE 115-*a* may determine the location of resources used for single coding scheme transmissions based on the offset and the grant message 305*a*. In other instances, the base station 105-*a* may transmit the grant message 305*a* to schedule resources for multi-coding scheme transmissions 310*a* and then use reserved bits in the DCI to indicate the location of the resources allocated for single-code transmissions 310*b*. For example, in some implementations, a DCI with CRC scrambled with P-RNTI may contain a 2-bit field with a reserved state (e.g., 00). The reserved state may be used to indicate location of the resources allocated for single-code transmissions 310*b*. The UE 110-*a* may then determine the location of the upcoming single-coding scheme transmission based on the grant message 305*a* and the information in the reserved bits of DCI.

In another example, FIG. 3 may illustrate scheduling of resources for single-code unicast shared channel transmissions. In some instances, unicast PDSCH and PUSCH transmissions are dynamically scheduled by grant messages having CRC scrambled with a cell RNTI (C-RNTI), configured scheduling RNTI (CS-RNTI), or a modulation and coding scheme RNTI (MCS-RNTI), or the PDSCH and PUSCH transmissions may be grant-free transmissions configured by radio resource control (RRC) signaling. As seen in FIG. 3, a base station 105-*a* may transmit a grant message 305*a* that schedules a unicast PDSCH or PUSCH transmission 310*a*. In some instances, a single-code UE 115-*a* may decode or encode the PDSCH or PUSCH transmission 310*a* using the coding scheme used by the single-code UE 115-*a* based on the grant message 305*a*. In other instances, the base station 105-*a* may optionally transmit a different and additional grant message 305*b* having CRC scrambled with a RNTI associated with the single-coding scheme of the single-code UE 115-*a*. The single-code UE 115-*a* may then determine resources for communicating the PDSCH or PUSCH transmission 310*b*.

As described above with respect to FIGS. 2 and 3, a base station 105-*a* may adapt to the presence of single-code UEs 115-*a* within its network by scheduling resources specifically for communications with the single-code UEs 115-*a* in a manner that is compatible with the capabilities of the single-code UEs 115-*a*. In order to accommodate single-code UEs 115-*a*, however, the base station 105-*a* may need to first identify that a particular UE 115-*a* is a single-code UE 115-*a* through various means. In some instances, a single-code UE 115-*a* may indicate its capability of single-coding scheme transmissions using initial access procedures, including through Message 1 of its initial access procedure. For example, a UE 115-*a* may indicate to the base station 105-*a* that it is a single-code UE 115-*a* by using separate random access channel (RACH) resources for transmission of Message 1. The separate RACH resources may be different from the RACH resources typically used by multi-code UEs 115-*a* for RACH procedures. Accordingly, when the base station 105-*a* receives a RACH request (Message 1) from the UE 115-*a* on the RACH resources used for indicating single-code capability, the base station 105-*a* may identify the UE 115-*a* as a single-code UE.

In some instances, the UE 115-*a* may alternatively or additionally indicate its capability as a single-code UE 115-*a* by transmitting different preambles in its RACH request. A multi-code UE 115-*a* may transmit a preamble from a first set of preambles while a single-code UE 115-*a* may transmit a preamble from a second or subset of preambles. The base station 105-*a* may then determine the UE 115-*a* capability based on which set of preambles the RACH request message is based on. Still further, in situations in which a two-step RACH procedure is used where Message 1 also carries data, the UE 115-*a* may transmit an additional Message 1 (e.g., Message A) to indicate single-code transmission capability. Following the indication of single-code capability to the base station 105-*a* in a RACH request, via separate RACH resources, separate RACH preambles, or an additional RACH message, the base station 105-*a* and UE 115-*a* may complete the initial access procedure (e.g., communication of Message 2, Message 3, Message 4) using the single coding scheme supported by the UE 115-*a*.

In some aspects, a UE 115-*a* may operate within a portion of a system bandwidth, or a bandwidth part (BWP), instead of using an entirety of the system bandwidth. Typically, a UE 115-a that operates using a BWP will receive information regarding its initial BWP allocation in the MIB. A single-code UE 115-a may rely on the initial BWP indication in the MIB for subsequent single-code communications within the initial BWP. Alternatively, the base station 105-a may use reserved bits in the MIB to assist the UE 115-a in determining its initial BWP allocation. Accordingly, the UE 115-a may receive the MIB containing the initial BWP allocation that is applicable to multi-code UEs and then determine the initial BWP allocation for the single-code UE 115-a based further on the reserved bits in the MIB.

Figure 4:
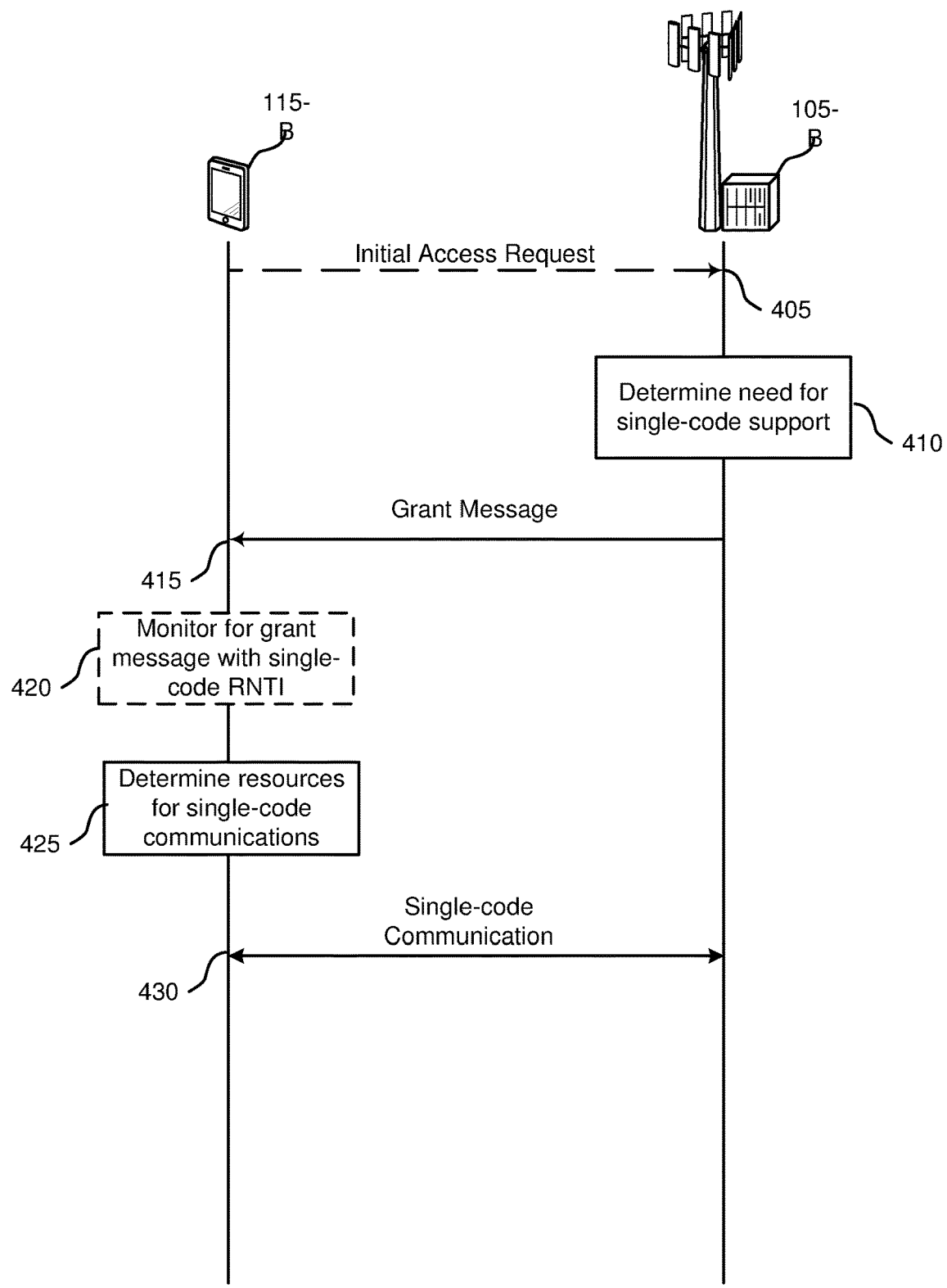
FIG. 4 illustrates an example process flow for scheduling single-code transmissions in accordance with various aspects of the present disclosure.

FIG. 4 illustrates an example of a process flow 400 that supports single-code wireless communications in accordance with various aspects of the present disclosure. In some examples, process flow 400 may implement aspects of wireless communication system 100 or 200. For example, process flow 400 includes UE 115-b and base station 105-b, which may be examples of the corresponding devices described with reference to FIGS. 1 and 2.

A UE 115-b may optionally transmit, at 405, an initial access request (e.g., a RACH request Message 1) to a base station 105-b. The UE 115-b may be a single-code UE and, accordingly, may indicate its single-code capability to the base station 105-b through the initial access request, such as by transmitting the request on predefined RACH resources used for indicating single-code capability, by using a particular preamble associated with single-code UEs, or by transmitting a separate RACH data message in addition to a typical RACH message, such as used in a two-step RACH procedure. The base station 105-b may then determine the need for providing support for communications with a single-code UE 115-b at 410. In response, at 415, the base station 105-b may send a grant message to the UE 115-b for scheduling single-code transmissions. For example, in some instances, the grant message may include a CRC scrambled with a RNTI that is specifically associated with single-code scheduling. Accordingly, at 420, the UE 115-b may optionally monitor for the grant message having the single-code RNTI in order to receive scheduling information for a subsequent single-code communication.

In other instances, however, the base station 105-b may transmit a grant message having a CRC scrambled with a RNTI that is not specifically associated with single-code scheduling. In other words, the UE 115-b may need to monitor for the same grant message that is used by multi-code UEs for scheduling. In this instance, the single-code UE 115-b may need to determine the resource allocation for single-code transmissions using additional information, such as an offset from the scheduled multi-code transmission or information contained in certain bits of a MIB regarding the location of single-code resources. Accordingly, at 425, the UE 115-b may determine the resources for communicating with the base station 105-b based on the received grant message. At 430, the UE 115-b and the base station 105-b may then communicate using single-code communications. The single-code communications may include transmitting or receiving SIB messages, paging messages, unicast PDSCH or PUSCH transmissions, or transmissions on BWP.

Figure 5:
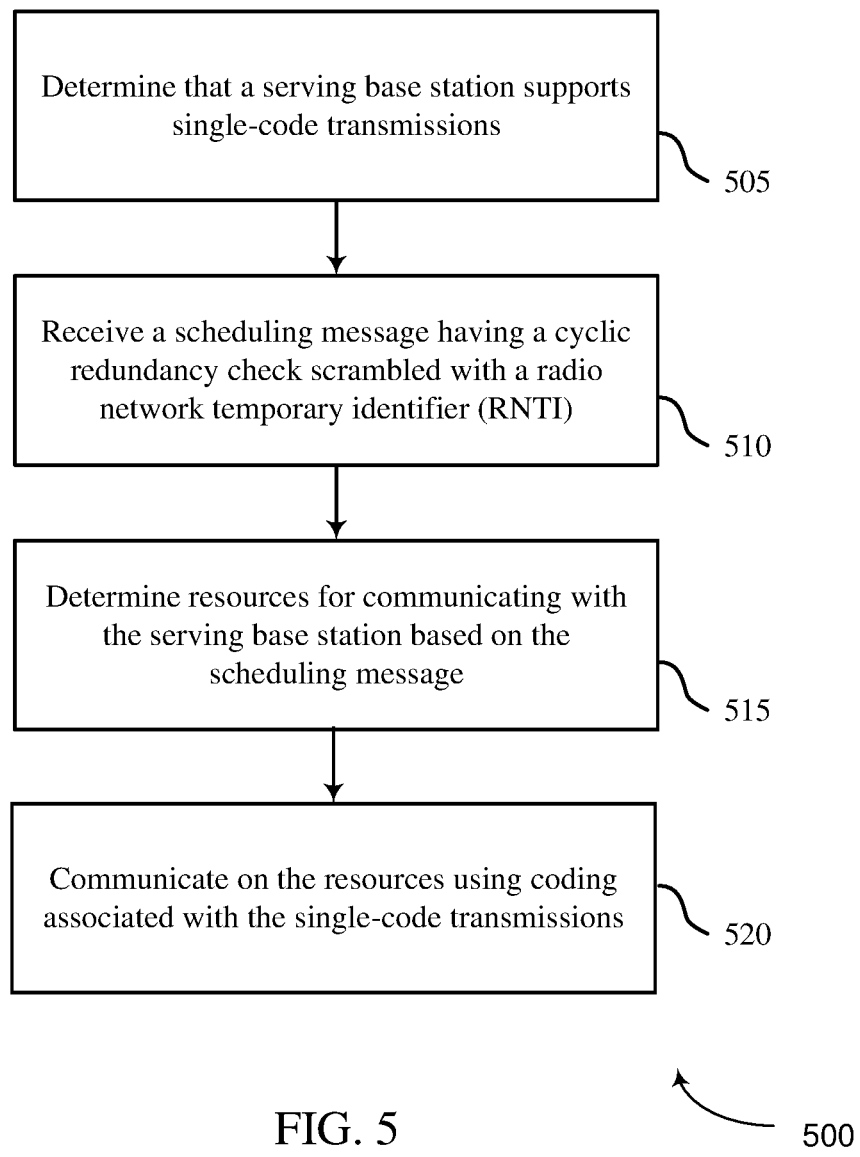
FIGS. 5-6 illustrate example methods for supporting single-code transmissions in accordance with aspects of the present disclosure.

FIG. 5 shows a flowchart illustrating a method 500 for support for single-code UEs in wireless communications in accordance with aspects of the present disclosure. The operations of method 500 may be implemented by a UE 115 or its components as described herein. For example, the operations of method 500 may be performed by a communications manager as described with reference to FIG. 7. In some examples, a UE 115 may execute a set of codes to control the functional elements of the device to perform the functions described below. Additionally or alternatively, the UE 115 may perform aspects of the functions described below using special-purpose hardware.

At 505, the UE 115 may determine that a serving base station supports single-code transmissions. The determination may include receiving an indication comprising at least one bit in a MIB or in a PBCH. At 510, the UE 115 may receive a scheduling message having a cyclic redundancy check scrambled with a RNTI. The RNTI may be a system information RNTI (SI-RNTI) or paging RNTI (P-RNTI) associated with single-code transmission scheduling, and the communicating may include receiving a system information block (SIB) or paging message, respectively, having coding associated with single-code transmissions. In other instances, the RNTI is a SI-RNTI or P-RNTI associated with multi-code transmission scheduling.

At 515, the UE 115 may determine resources for communicating with the serving base station based on the scheduling message. In some instances, the determining resources may comprise identifying resources, located at an offset from resources scheduled by the scheduling message, for receiving a SIB or paging message having coding associated with single-code transmissions. In other instances, the determining resources comprises identifying resources, based additionally on bits in a master information block (MIB), for receiving a system information block (SIB) having coding associated with single-code transmissions. For receiving a paging message, the UE may identify the resources based on bits in a MIB or SIB. In some situations, the scheduling message includes a field indicating an upcoming paging message having coding associated with single-code transmissions, and may further indicate whether a short message is present in the scheduling message.

At 520, the UE may communicate on the resources using coding associated with the single-code transmissions, which may include receiving a system information block (SIB) on a Physical Downlink Control Channel (PDCCH). In some instances, the RNTI is a C-RNTI, CS-RNTI, or MCS-C-RNTI associated with single-code transmission scheduling, and the communicating includes unicast single-code transmissions on a downlink or uplink shared channel. In certain instances, the UE may optionally send a random access message using a preamble associated with single-code transmissions to inform the base station of the UE's single-code capability. The UE may further include an indication of single-code transmission support in a random access message, encode a data portion of the random access message using a particular coding associated with single-code transmissions, and transmit the random access message. In some instances, the UE may also determine an initial bandwidth part parameter, such as initial bandwidth part frequency range or resource allocation, based at least on an indication in the MIB.

Figure 6:
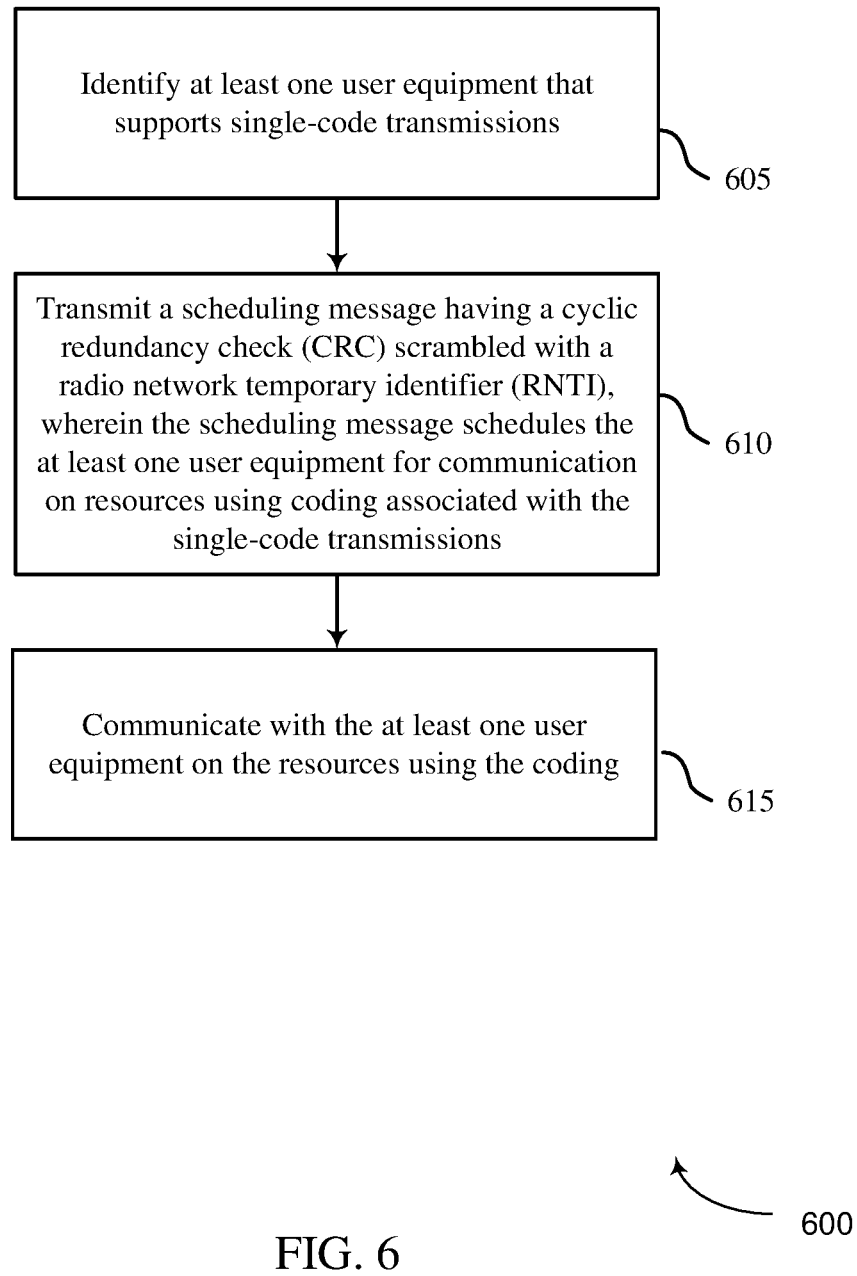

FIG. 6 shows a flowchart illustrating a method 600 for support for single-code UEs in wireless communications in accordance with aspects of the present disclosure. The operations of method 600 may be implemented by a base station 105 or its components as described herein. For example, the operations of method 600 may be performed by a communications manager as described with reference to FIG. 7. In some examples, a base station 105 may execute a set of codes to control the functional elements of the device to perform the functions described below. Additionally or alternatively, the base station 105 may perform aspects of the functions described below using special-purpose hardware.

At 605, the base station 105 identifies at least one user equipment that supports single-code transmissions. In some instances, the RNTI is associated with single-code transmission scheduling. The base station 105 may optionally transmit a second scheduling message having a CRC scrambled with a RNTI associated with multi-code transmission scheduling, wherein the second scheduling message schedules at least a second user equipment for communication on resources using coding associated with the multi-code transmission scheduling. In other instances, the RNTI is associated with multi-code transmission scheduling. The base station 105 may identify the at least one user equipment by receiving a random access message on random access channel (RACH) resources associated with single-code transmissions, receiving a preamble associated with single-code transmissions in the random access message, or receiving an indication in the random access message. At 610, the base station 105 may transmit a scheduling message having a cyclic redundancy check (CRC) scrambled with a radio network temporary identifier (RNTI), wherein the scheduling message schedules the at least one user equipment for communication on resources using coding associated with the single-code transmissions. At 615, the base station 105 may communicate with the at least one user equipment on the resources using the coding. In some instances, the communication is based at least in part on the scheduling message and an offset from resources scheduled by the scheduling message according to multi-code transmission scheduling. In certain instances, the base station 105 may optionally including an offset in a master information block (MIB), using a bit in the MIB, that provides information for determining the resources and then transmitting the MIB. The base station 105 may also include an offset in a system information block (SIB) that provides information for determining the resources and transmit the SIB.

Figure 7:
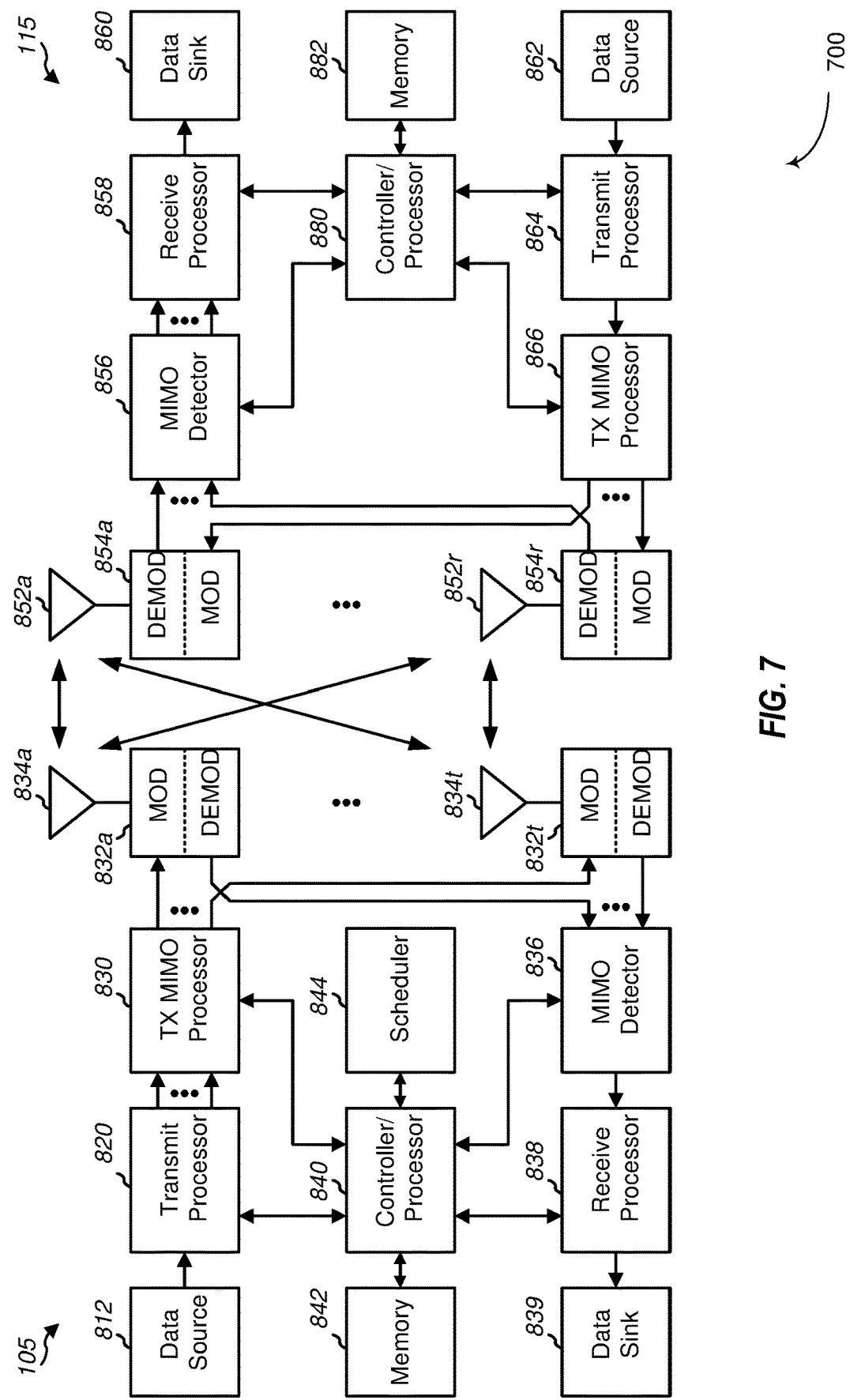
FIG. 7 is a block diagram illustrating a design of a base station/gNB/TRP and a UE configured according to one aspect of the present disclosure.

FIG. 7 shows a block diagram 700 of a design of a base station/eNB 105 and a UE 115, which may be one of the base stations/eNBs and one of the UEs in FIG. 1. At the eNB 105, a transmit processor 820 may receive data from a data source 712 and control information from a controller/processor 740. The control information may be for various control channels such as the PBCH, PCFICH, PHICH, PDCCH, EPDCCH, MPDCCH etc. The data may be for the PDSCH, etc. The transmit processor 720 may process (e.g., encode and symbol map) the data and control information to obtain data symbols and control symbols, respectively. The transmit processor 720 may also generate reference symbols, e.g., for the PSS, SSS, and cell-specific reference signal. A transmit (TX) multiple-input multiple-output (MIMO) processor 730 may perform spatial processing (e.g., precoding) on the data symbols, the control symbols, and/or the reference symbols, if applicable, and may provide output symbol streams to the modulators (MODs) 732a through 732t. Each modulator 732 may process a respective output symbol stream (e.g., for OFDM, etc.) to obtain an output sample stream. Each modulator 732 may further process (e.g., convert to analog, amplify, filter, and upconvert) the output sample stream to obtain a downlink signal. Downlink signals from modulators 732a through 732t may be transmitted via the antennas 734a through 734t, respectively. The downlink signals may include scheduling messages having a CRC scrambled with a RNTI, such as a SI-RNTI, P-RNTI, C-RNTI, CS-RNTI, or MCS-C-RNTI. The downlink signals may also include system information, paging messages, or data messages transmitted in accordance with single-code transmissions, as described above with reference to FIGS. 2-6.

At the UE 115, the antennas 752a through 752r may receive the downlink signals from the eNB 105 and may provide received signals to the demodulators (DEMODs) 754a through 754r, respectively. Each demodulator 754 may condition (e.g., filter, amplify, downconvert, and digitize) a respective received signal to obtain input samples. Each demodulator 754 may further process the input samples (e.g., for OFDM, etc.) to obtain received symbols. A MIMO detector 756 may obtain received symbols from all the demodulators 754a through 754r, perform MIMO detection on the received symbols if applicable, and provide detected symbols. A receive processor 758 may process (e.g., demodulate, deinterleave, and decode) the detected symbols, provide decoded data for the UE 115 to a data sink 760, and provide decoded control information to a controller/processor 780.

On the uplink, at the UE 115, a transmit processor 764 may receive and process data (e.g., for the PUSCH) from a data source 762 and control information (e.g., for the PUCCH) from the controller/processor 780. The transmit processor 764 may also generate reference symbols for a reference signal. The symbols from the transmit processor 764 may be precoded by a TX MIMO processor 766 if applicable, further processed by the modulators 754a through 754r (e.g., for SC-FDM, etc.), and transmitted to the eNB 105. The transmissions to the eNB 105 may include random access message or transmissions according to single-code communications, for example. At the eNB 105, the uplink signals from the UE 115 may be received by the antennas 734, processed by the demodulators 732, detected by a MIMO detector 736 if applicable, and further processed by a receive processor 738 to obtain decoded data and control information sent by the UE 115. The processor 738 may provide the decoded data to a data sink 739 and the decoded control information to the controller/processor 740.

The controllers/processors 740 and 780 may direct the operation at the eNB 105 and the UE 115, respectively. The controller/processor 740 and/or other processors and modules at the eNB 105 may perform or direct the execution of the functional blocks illustrated in FIG. 6, and/or other various processes for the techniques described herein. The controllers/processor 780 and/or other processors and modules at the UE 115 may also perform or direct the execution of the functional blocks illustrated in FIG. 5, and/or other processes for the techniques described herein. The memories 742 and 782 may store data and program codes for the eNB 105 and the UE 115, respectively. For example, memory 742 may store instructions that, when performed by the processor 740 or other processors depicted in FIG. 7, cause the base station 105 to perform operations described with respect to FIG. 6. Similarly, memory 782 may store instructions that, when performed by processor 780 or other processors depicted in FIG. 7 cause the UE 115 to perform operations described with respect to FIG. 5. A scheduler 744 may schedule UEs for data transmission on the downlink and/or uplink.

While blocks in FIG. 7 are illustrated as distinct components, the functions described above with respect to the blocks may be implemented in a single hardware, software, firmware, or combination component or in various combinations of components. For example, the functions described with respect to the transmit processor 720, the receive processor 738, or the TX MIMO processor 730 may be performed by or under the control of processor 740.

Turning now to FIG. 8, a UE 800, such as a UE 115 (see FIG. 7), may have a controller/processor 780, a memory 782, and antennas 752a through 752r, as described above with respect to FIG. 7. UE 800 may also have wireless radios 801*a* to 801*r* that comprise additional components also described above with reference to FIG. 7. The memory 782 of UE 800 stores one or more algorithms that configure processor/controller 780 to carry out one or more procedures including, for example, those described above with reference to FIG. 5.

One or more algorithms stored by memory 782 configure processor/controller 780 to carry out one or more procedures relating to wireless communication by the UE 800, as previously described. For example, an initial access manager 802 may configure controller/processor 880 to determine that a serving base station or eNB/gNB 900 supports single-code transmissions. The initial access manage 802 may also indicate the UE 800 single-code capability through transmission of random access message on RACH resources associated with single-code transmissions or using a preamble associated with single-code transmissions in the random access message. A control information manager 804 may configure controller/processor 780 to receive scheduling messages received in a PDCCH by wireless radios 801*a* to 801*r*. The scheduling messages may have a CRC scrambled with a RNTI that may be associated with single-code communications. Also, a communication manager 806 may configure controller/processor 780 to carry out operations including communicating, via wireless radios 801*a* to 801*r*, on a control or shared channel, and/or on the resources allocated to single-code communications. Other operations as described above may be carried out by one or more of the described algorithms or components 802, 804, 806 and/or their various subcomponents.

Each of the illustrated components 802, 804, and 806 and/or at least some of their various sub-components may be implemented in hardware, software executed by a processor, firmware, or any combination thereof. If implemented in software executed by a processor, the functions of the initial access manager 802, control information manager 804, communication manager 806 and/or at least some of their various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The initial access manager 802, control information manager 804, communication manager 806 and/or at least some of their various sub-components may be physically located at various positions, including being distributed such that portions of functions are implemented at different physical locations by one or more physical devices. In some examples, initial access manager 802, control information manager 804, communication manager 806 and/or at least some of their various sub-components may be a separate and distinct component in accordance with various aspects of the present disclosure. In other examples, initial access manager 802, control information manager 804, communication manager 806 and/or at least some of their various sub-components may be combined with one or more other hardware components, including but not limited to an I/O component, a transceiver, a network server, another computing device, one or more other components described in the present disclosure, or a combination thereof in accordance with various aspects of the present disclosure.

Referring now to FIG. 9, a base station 900, such as a base station 105 (see FIG. 7), may have a controller/processor 740, a memory 742, and antennas 734*a* through 734*t*, as described above. The base station 900 may also have wireless radios 901*a* to 901*t* that comprise additional components also described above with reference to FIG. 8. The memory 742 of base station 900 stores one or more algorithms that configure processor/controller 740 to carry out one or more procedures as described above with reference to FIG. 6.

One or more algorithms stored by memory 742 configure processor/controller 740 to carry out one or more operations relating to wireless communication by the base station 900, as previously described. For example, an initial access manager 902 configures controller processor 740 to carry out operations that include identifying at least one user equipment that supports single-code transmissions. In some instances, the identification may include receiving a random access message on random access channel (RACH) resources associated with single-code transmissions, receiving a preamble associated with single-code transmissions in the random access message, or receiving an indication in the random access message. Based on the received random access message, the base station 900 may identify the UE 800 that supports single-code transmissions. In addition, a scheduling manager 904 configures controller processor 840 to carry out operations that include transmitting a scheduling message to a UE 800 for scheduling single-code and/or multi-code UEs for future communications. In some instances, a scrambling manager 906 configures controller processor 740 to carry out operations that include scrambling a CRC with a RNTI and including the scrambled CRC with the scheduling message. The RNTI may comprise a SI-RNTI, P-RNTI, or other type of RNTI that allows a UE 800 to properly receive the scheduling message and determine allocated resources for either single-code or multi-code transmissions. In some instances, a communication manager 908 configures controller processor 740 to carry out operations that include communicating with the UE 800 on the resources using the coding associated with the single-code transmissions. Other operations as described above may be carried out by one or more of the described algorithms or components 902, 904, 906, 908, and/or their various sub-components.

Each of the illustrated components 902, 904, 906, and 908 and/or at least some of their various sub-components may be implemented in hardware, software executed by a processor, firmware, or any combination thereof. If implemented in software executed by a processor, the functions of the initial access manager 902, scheduling manager 904, scrambling manager 906, communication manager 908 and/or at least some of their various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The initial access manager 902, scheduling manager 904, scrambling manager 906, communication manager 908 and/or at least some of their various sub-components may be physically located at various positions, including being distributed such that portions of functions are implemented at different physical locations by one or more physical devices. In some examples, initial access manager 902, scheduling manager 904, scrambling manager 906, communication manager 908 and/or at least some of their various sub-components may be a separate and distinct component in accordance with various aspects of the present disclosure. In other examples, initial access manager 902, scheduling manager 904, scrambling manager 906, communication manager 908 and/or at least some of their various subcomponents may be combined with one or more other hardware components, including but not limited to an I/O component, a transceiver, a network server, another computing device, one or more other components described in the present disclosure, or a combination thereof in accordance with various aspects of the present disclosure.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   determining that a serving base station supports multi-code and single-code transmissions;
   receiving a scheduling message having a cyclic redundancy check scrambled with a radio network temporary identifier (RNTI), wherein the RNTI is a system information RNTI (SI-RNTI) associated with single-code transmission scheduling;
   determining resources for communicating with the serving base station based on the scheduling message; and
   communicating on the resources using coding associated with the single-code transmissions, wherein the communicating includes receiving a system information block (SIB) having coding associated with single-code transmissions.

2. The method of claim 1, wherein the determining that the serving base station supports single-code transmissions includes receiving an indication comprising at least one bit in a master information block (MIB) or in a Physical Broadcast Channel (PBCH).

3. The method of claim 1, further comprising receiving a second scheduling message having a cyclic redundancy check scrambled with a second RNTI that is a system information RNTI (SI-RNTI) associated with multi-code transmission scheduling.

4. The method of claim 3, further comprising receiving a second SIB having coding associated with single-code transmissions on resources located at an offset from resources scheduled by the second scheduling message.

5. The method of claim 3, further comprising receiving a second SIB having coding associated with single-code transmissions on resources based additionally on reserved bits in a master information block (MIB).

6. The method of claim 1, wherein the communicating includes receiving a system information block (SIB) on a Physical Downlink Control Channel (PDCCH).

7. The method of claim 1, further comprising receiving a second scheduling message having a cyclic redundancy check scrambled with a second RNTI that is a paging RNTI (P-RNTI) associated with single-code transmission scheduling, and wherein the communicating includes receiving a paging message having coding associated with single-code transmissions.

8. The method of claim 1, further comprising receiving a second scheduling message having a cyclic redundancy check scrambled with a second RNTI that is a paging RNTI (P-RNTI) associated with multi-code transmission scheduling.

9. The method of claim 8, further comprising receiving a paging message having coding associated with single-code transmissions on resources located at an offset from resources scheduled by the second scheduling message.

10. The method of claim 8, wherein the determining resources comprises identifying further comprising receiving a paging message having coding associated with single-code transmissions on resources based additionally on bits in a master information block (MIB) or a SIB.

11. The method of claim 8, wherein the second scheduling message includes a field indicating an upcoming paging message having coding associated with single-code transmissions.

12. The method of claim 11, wherein the field further indicates whether a short message is present in the second scheduling message.

13. The method of claim 8, wherein a bit in a master information block (MIB) indicates whether a short message is present in the second scheduling message.

14. The method of claim 1, further comprising receiving a second scheduling message having a cyclic redundancy check scrambled with a second RNTI that is a cell RNTI (C-RNTI), configured scheduling RNTI (CS-RNTI), or a modulation and coding scheme RNTI (MCS-RNTI) associated with single-code transmission scheduling, and wherein the communicating includes unicast single-code transmissions on a downlink or uplink shared channel.

15. The method of claim 1, further comprising sending a random access message on random access channel (RACH) resources associated with single-code transmissions.

16. The method of claim 1, further comprising sending a random access message using a preamble associated with single-code transmissions.

17. The method of claim 1, further comprising:
including an indication of single-code transmission support in a random access message;
encoding a data portion of the random access message using a particular coding associated with single-code transmissions; and
transmitting the random access message.

18. The method of claim 1, further comprising determining an initial bandwidth part parameter based at least on an indication in a master information block (MIB).

19. An apparatus for wireless communications, comprising:
a processor;
memory coupled with the processor; and
instructions stored in the memory and operable, when executed by the processor, to cause the apparatus to:
determine that a serving base station supports multi-code and single-code transmissions;
receive a scheduling message having a cyclic redundancy check scrambled with a radio network temporary identifier (RNTI), wherein the RNTI is a system information RNTI (SI-RNTI) associated with single-code transmission scheduling;
determine resources for communicating with the serving base station based on the scheduling message; and
communicate on the resources using coding associated with the single-code transmissions, wherein the communicating includes receiving a system information block (SIB) having coding associated with single-code transmissions.

20. The apparatus of claim 19, wherein the determining that the serving base station supports single-code transmissions includes receiving an indication comprising at least one bit in a master information block (MIB) or in a Physical Broadcast Channel (PBCH).

21. The apparatus of claim 19, further comprising receiving a second scheduling message having a cyclic redundancy check scrambled with a second RNTI that is a system information RNTI (SI-RNTI) associated with multi-code transmission scheduling.

22. The apparatus of claim 21, further comprising instructions operable to receive a second SIB having coding associated with single-code transmissions on resources located at an offset from resources scheduled by the second scheduling message.

23. The apparatus of claim 21, further comprising instructions operable to receive a second SIB having coding associated with single-code transmissions on resources based additionally on reserved bits in a master information block (MIB).

24. The apparatus of claim 19, wherein the communicating includes receiving a system information block (SIB) on a Physical Downlink Control Channel (PDCCH).

25. The apparatus of claim 19, wherein the further comprising instructions operable to receive a second scheduling message having a cyclic redundancy check scrambled with a second RNTI that is a paging RNTI (P-RNTI) associated with single-code transmission scheduling, and wherein the communicating includes receiving a paging message having coding associated with single-code transmissions.

26. The apparatus of claim 19, wherein the further comprising instructions operable to receive a second scheduling message having a cyclic redundancy check scrambled with a second RNTI that is a paging RNTI (P-RNTI) associated with multi-code transmission scheduling.

27. The apparatus of claim 26, further comprising receiving a paging message having coding associated with single-code transmissions on resources located at an offset from resources scheduled by the second scheduling message, for receiving a paging message having coding associated with single-code transmissions.

28. The apparatus of claim 26, further comprising receiving a paging message having coding associated with single-code transmissions on resources based additionally on bits in a master information block (MIB) or a SIB.

29. The apparatus of claim 26, wherein the second scheduling message includes a field indicating an upcoming paging message having coding associated with single-code transmissions.

30. The apparatus of claim 29, wherein the field further indicates whether a short message is present in the second scheduling message.

31. The apparatus of claim 26, wherein a bit in a master information block (MIB) indicates whether a short message is present in the second scheduling message.

32. The apparatus of claim 19, further comprising instructions operable to receive a second scheduling message having a cyclic redundancy check scrambled with a second RNTI that is a cell RNTI (C-RNTI), configured scheduling RNTI (CS-RNTI), or a modulation and coding scheme RNTI (MCS-RNTI) associated with single-code transmission scheduling, and wherein the communicating includes unicast single-code transmissions on a downlink or uplink shared channel.

33. The apparatus of claim 19, further comprising instructions operable to cause the apparatus to send a random access message on random access channel (RACH) resources associated with single-code transmissions.

34. The apparatus of claim 19, further comprising instructions operable to cause the apparatus to send a random access message using a preamble associated with single-code transmissions.

35. The apparatus of claim 19, further comprising instructions operable to cause the apparatus to:
include an indication of single-code transmission support in a random access message;
encode a data portion of the random access message using a particular coding associated with single-code transmissions; and
transmit the random access message.

36. The apparatus of claim 19, further comprising instructions operable to cause the apparatus to determine an initial bandwidth part parameter based at least on an indication in a master information block (MIB).

37. A non-transitory computer-readable medium storing code for wireless communication, the code comprising instructions executable to:
determine that a serving base station supports multi-code and single-code transmissions;
receive a scheduling message having a cyclic redundancy check scrambled with a radio network temporary identifier (RNTI), wherein the RNTI is a system information RNTI (SI-RNTI) associated with single-code transmission scheduling;

determine resources for communicating with the serving base station based on the scheduling message; and communicate on the resources using coding associated with the single-code transmissions, wherein the communicating includes receiving a system information block (SIB) having coding associated with single-code transmissions.

38. An apparatus for wireless communications, comprising:

means for determining that a serving base station supports multi-code and single-code transmissions;

means for receiving a scheduling message having a cyclic redundancy check scrambled with a radio network temporary identifier (RNTI), wherein the RNTI is a system information RNTI (SI-RNTI) associated with single-code transmission scheduling;

means for determining resources for communicating with the serving base station based on the scheduling message; and means for communicating on the resources using coding associated with the single-code transmissions, wherein the means for communicating includes means for receiving a system information block (SIB) having coding associated with single-code transmissions.

39. The apparatus of claim 38, wherein the means for determining that the serving base station supports single-code transmissions includes means for receiving an indication comprising at least one bit in a master information block (MIB) or in a Physical Broadcast Channel (PBCH).

40. The apparatus of claim 38, further comprising means for sending a random access message on random access channel (RACH) resources associated with single-code transmissions.

* * * * *